United States Patent [19]

Hsia

[11] 4,005,346
[45] Jan. 25, 1977

[54] DIRECT ELECTROMAGNETIC RECIPROCATING MOTOR

[76] Inventor: Tsang-Chen Hsia, 58, Lane 72, Sec. 3, Ho Pin East Rd., Taipei, China /Taiwan

[22] Filed: Oct. 29, 1975

[21] Appl. No.: 626,853

[52] U.S. Cl. .............................. 318/128; 318/132; 318/134; 310/35

[51] Int. Cl.² ...................................... H02K 33/10

[58] Field of Search ............ 318/119–135; 310/23, 24, 30, 39, 35

[56] References Cited

UNITED STATES PATENTS

| | | | |
|---|---|---|---|
| 431,495 | 7/1890 | Van De Poele | 318/124 |
| 2,686,280 | 8/1954 | Strong et al. | 318/128 X |
| 2,701,331 | 2/1955 | Holst | 310/35 X |
| 2,892,140 | 6/1959 | Praeg | 318/128 |
| 3,215,916 | 11/1965 | Hermann | 318/125 X |
| 3,328,656 | 6/1967 | Dotson | 318/134 X |
| 3,454,957 | 7/1969 | Chaplenko | 318/128 X |
| 3,754,154 | 8/1973 | Massie | 310/34 X |
| 3,832,608 | 8/1974 | Mills | 318/134 X |
| 3,846,682 | 11/1974 | Massie | 310/34 X |
| 3,932,792 | 1/1976 | Massie | 310/34 X |

*Primary Examiner*—Donovan F. Duggan
*Attorney, Agent, or Firm*—Holman & Stern

[57] ABSTRACT

An electromagnetic reciprocating motor is disclosed having a minimum number of moving parts. The motor consists of a hollow, tubular guide having a first drive coil mounted about a first end, a second drive coil mounted about a second end, and a third drive coil mounted about a central portion thereof. A ferromagnetic piston is mounted in sliding engagement within the hollow guide and a ferromagnetic pivot plate is pivotally mounted on the central portion of the guide with a switching means attached thereto for alternately energizing the first or second drive coils.

10 Claims, 6 Drawing Figures

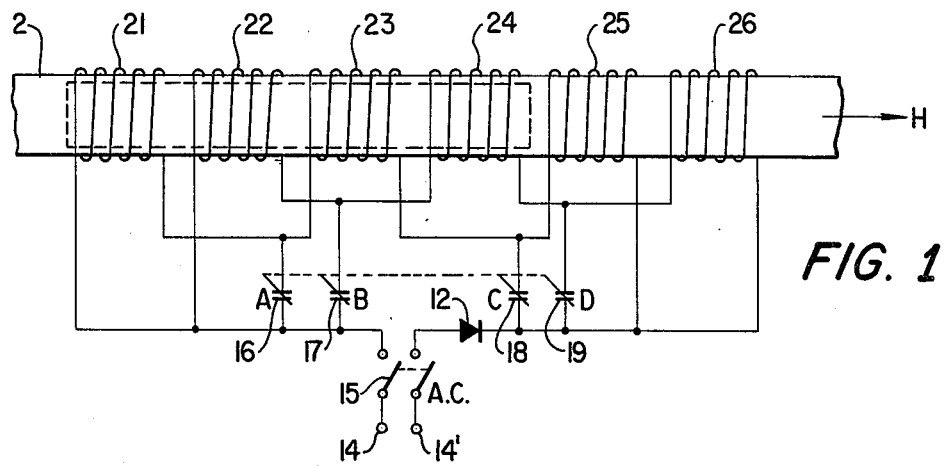
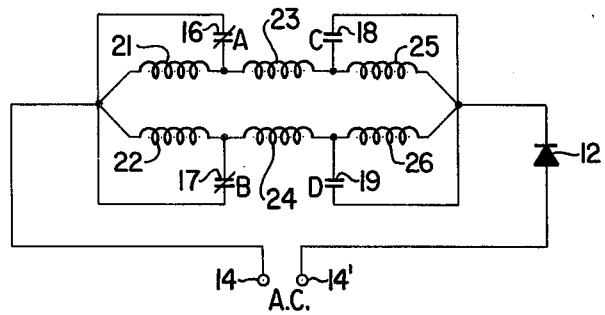
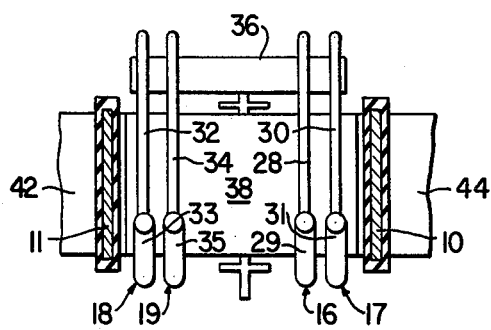
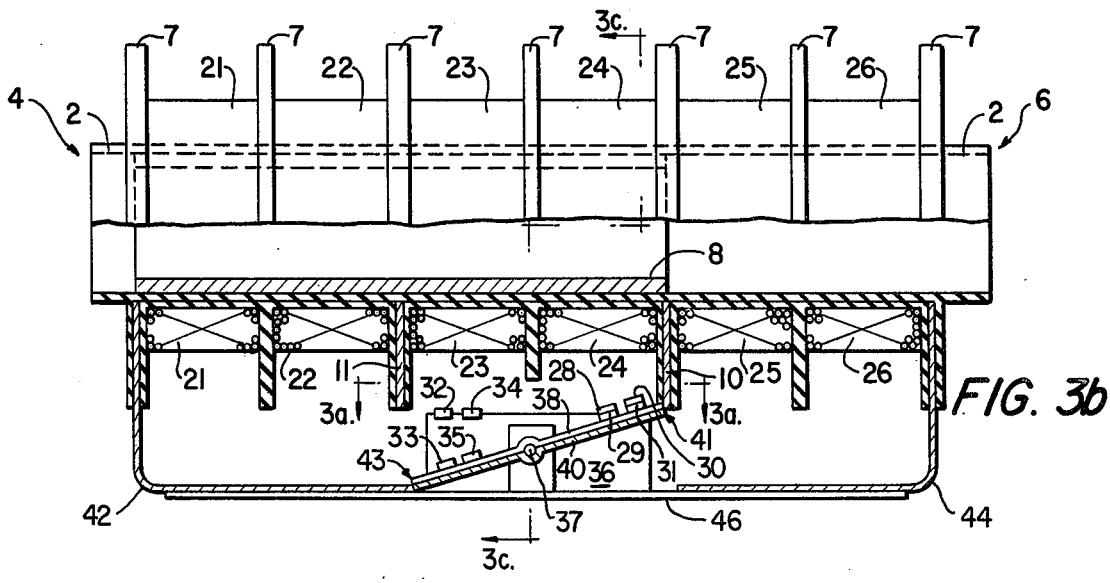

DIRECT ELECTROMAGNETIC RECIPROCATING MOTOR

BACKGROUND OF THE INVENTION

The principal means by which reciprocating motion is provided in the prior art is through the use of a rotary motor to which is connected a crank shaft, wrist pin and piston. In applications requiring reciprocating motion, such as fluid compressors, the rotary motor, wrist pin and piston, and crank shaft present an unnecessarily bulky package for powering the system. Substantial energy is lost in the conversion of rotary motion to reciprocating motion by a crank shaft. In addition, the surfaces of the crank shaft and wrist pin must undergo repeated high impacts, causing increased wear rates. What the art needs is a more reliable and efficient reciprocating motor which is suitable for miniaturization.

OBJECTS OF THE INVENTION

It is therefor the object of the invention to provide reciprocating motion in a more efficient manner than available in the prior art.

It is still a further object of the invention to provide reciprocating motion by a more compact means than was available in the prior art.

It is still another object of the invention to provide reciprocating motion with a means having a high reliability.

SUMMARY OF THE INVENTION

These and other objects, features, and advantages of the invention are provided by the direct electromagnetic reciprocating motor disclosed herein. The reciprocating motor invention comprises a hollow, tubular guide having a first drive coil mounted about a first end, a second drive coil mounted about a second end, and a third coil mounted about a central portion thereof. A ferromagnetic piston is mounted in sliding engagement within the hollow guide, having a length which overlaps the first and third drive coils when located at a first end and which overlaps the second and third drive coils when located at a second end. A first ferromagnetic pole piece is mounted on the central portion of the guide and spaced at a piston length from the first end thereof. A second ferromagnetic pole piece is mounted on the central portion of the guide and spaced at the piston length from the second end thereof. A ferromagnetic pivot plate is pivotally mounted on the central portion of the guide, having a first end which contacts the first pole piece at a first pivotal position and a second end which contacts the second pole piece at a second pivotal position. The plate pivots into the first pivotal position forming a first magnetic circuit with the piston when the piston is at the first end of the guide. The plate pivots into the second pivotal position forming a second magnetic circuit with the piston when the piston is at the second end of the guide. An electrical switching means is mounted on the pivot plate and is electrically connected to the first and second drive coils, for energizing the first drive coil when the plate is at a second pivotal position and for energizing the second drive coil when the plate is at the first pivotal position. The cooperation of the piston and pivot plate cause the piston to be forced into a reciprocating motion within the guide. The resulting reciprocating motor has a more efficient operation, a greater reliability, smaller number of parts, and is more amenable to miniaturization than was capable by the prior art.

An alternate embodiment is disclosed, which develops greater power by employing a thyristor circuit triggered by sensing coils which sense the passage of the piston, to sequentially switch a plurality of drive coils.

DESCRIPTION OF THE FIGURES

These and other objects, features and advantages of the invention will be more fully understood with reference to the accompanying figures.

FIG. 1 illustrates the relative position and interconnection of the drive coils for the reciprocating motor.

FIG. 2 is a schematic illustration of the drive circuit for the reciprocating motor.

DISCUSSION OF THE PREFERRED EMBODIMENT

Figure 3C:
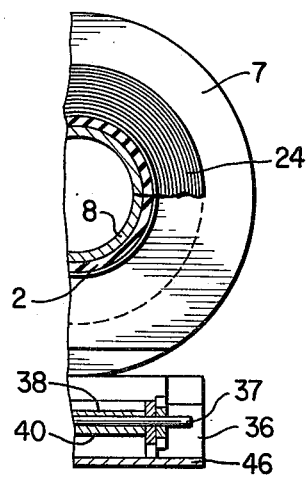
FIG. 3 is a three view, orthogonal projection of the structure of the reciprocating motor.

The structure of the direct electromagnetic reciprocating motor is shown to best advantage in FIG. 3. The reciprocating motor comprises a hollow tubular guide 2 having first drive coils 21 and 22 mounted about a first end 4, second drive coils 25 and 26 mounted about a second end 6, and third drive coils 23 and 24 mounted about the central portion of the guide 2. The drive coils 21–26 are separated by spacers 7 mounted on guide 2. The hollow tubular guide 2 may be composed of a nonferromagnetic material, as for example a ceramic or a plastic such as nylon. A ferromagnetic piston 8 is composed of a non-magnetized, magnetically hard alloy such as Alnico, so as to not become permanently magnetized in the magnetic field produced by drive coils 21–26. The piston 8 is mounted in sliding engagement with the hollow tubular guide 2. The ferromagnetic piston has a length which overlaps the first drive coil 21 and third drive coil 24 when located at the first end 4 of the guide 2 and which overlaps the second drive coil 26 and the third drive coil 23 when located at the second end 6 of the tubular guide 2.

The illustration of FIG. 1 shows the arrangement of drive coils 21 through 26, each of which is wound in the same direction so as to produce the rightwardly directed magnetic field represented by the Vector H. Drive coils 21, 23 and 25 are connected in series with the diode 12 across the alternating current supply terminals 14 and 14'. Drive coils 22, 24 and 26 are connected in series, and the series array connected in parallel with drive coils 21, 23 and 25. Contact means or switch 16 connects the node between drive coils 21 and 23 to the AC terminal 14 and switch 17 connects the node between drive coils 22 and 24 to the AC terminal 14. Switch 18 connects the node between drive coils 23 and 25 to AC terminal 14' and the switch 19 connects the node between coils 24 and 26 to the AC terminal 14'. The circuit interconnection of the various components may be seen to better advantage by reference to the schematic diagram of FIG. 2.

Switching means 16 and 17 are simultaneously turned on or off and switching means 18 and 19 are simultaneously turned on or off. Switching means 16 and 17 always have a conductive state opposite to that of switching means 18 and 19. The closing of switches 16 and 17 serves to shunt current around the coils 21 and 22, respectively. The closing of the switches 18 and 19 serves to shunt the current around the coils 25 and 26, respectively.

Returning to FIG. 3, the structural details of the switching means 16, 17, 18 and 19 may be seen to better advantage. A first ferromagnetic pole piece 10 mounted on the central portion of the guide 2 is spaced a distance equal to the length of piston 8, from the first end 4 of the guide 2. A second ferromagnetic pole piece 11 mounted on the central portion of the guide 2, is spaced a distance equal to the length of piston 8, from the second end 6 of the guide 2. A first ferromagnetic yoke 42 having an upper end mounted on the first end 4 of the guide 2 has a second, lower end spaced from the central portion of the guide 2. A second ferromagnetic yoke 44 has a first end mounted at the second end 6 of the guide 2 and a lower, second end spaced from the central portion of the guide 2. A nonferromagnetic base 46 is connected to the lower ends of the yokes 42 and 44. Mounted on the base 46 is the block 36 through which a horizontal shaft 37 is supported. A ferromagnetic pivot plate 40 is pivotally mounted on the shaft 37 beneath the central portion of the guide 2. The ferromagnetic pivot plate 40 has a first end 41 and a second end 43. When the forromagnetic pivot plate 40 is in a first pivotal position as shwon in FIG. 3, the first end 41 contacts the first pole piece 10 and the second end 43 contacts the lower portion of the ferromagnetic yoke 42. When the ferromagnetic pivot plate is in its second pivotal position, the first end 41 contacts the lower end of the ferromagnetic yoke 44 and its second end 43 contacts the ferromagnetic pole piece 11. When the ferromagnetic piston 8 is at the first end 4 of the guide 2, as is shown in FIG. 3, a magnetic flux produced by the coils 21, 22, 23 and 24 passes from the right end of piston 8 into the pole piece 10 thereby attracting the end 41 of the ferromagnetic pivot plate 40 so that it assumes its first pivotal position, as shown in FIG. 3. The pivot plate 40, yoke 42, piston 8 and pole piece 10 form a first magnetic circuit when the piston is at the first end 4 of the guide 2. Similarly, the pivot plate 40 will pivot into its second pivotal position forming a second magnetic circuit with a piston 8, second pole piece 11, and second yoke 44, conducting the magnetic flux produced by the coils 23-26, when the piston is at the second end 6 of the guide 2.

The structural arrangement of the switches 16, 17, 18 and 19 can be seen to special advantage in the plan view of FIG. 3. Switch 16 is comprised of the moveable element 29 mounted on the insulating layer 38 attached to the ferromagnetic pivot plate 40, and the stationary portion 28 mounted to the block 36. Switch 17 is comprised of the moveable element 31 mounted to the insulating layer 38 of the pivot plate 40, and the stationary element 30 mounted to the block 36. Switch 18 is comprised of the moveable element 33 mounted to the insulating layer 38 of the pivot plate 40, and the stationary portion 32 mounted to the block 36. Switch 19 is comprised of the moveable element 35 mounted to the insulating layer 38 of the pivot plate 40, and the stationary portion 34 mounted to the block 36.

In operation, the reciprocating motor invention works as follows. AC supply voltage is supplied at the terminals 14 and 14' and, with the switch 15 closed, the diode 12 rectifies the supply voltage to a pulsating DC. This DC current flows through series array of coils 21, 23, and 25 and the series array of coils 22, 24, and 26. Coils 21 and 22 and coils 25 and 26 are alternately shunted by the switches 16 and 17 switches 18 and 19, respectively, through the pivoting action of the pivot plate 40. When the ferromagnetic piston 8 is at the first end 4 of the hollow guide 2, it forms a closed magnetic circuit with the pole piece 10, pivot plate 40, and yoke 42, conducting the magnetic flux produced by the coils 23 and 24 so as to retain the pivot plate in its first positon shown in FIG. 3, thereby closing the contacts 16 and 17. When the contacts 16 and 17 are closed, the coils 21 and 22 are shunted, and the resultant magnetic field produced by the coils 23, 24 and 25 and 26 attracts the ferromagnetic piston 8 toward the second end 6 of the guide 2. When the piston 8 reaches the end 6, the magnetic flux conducted by the ferromagnetc piston flows through the pole piece 11 attracting the end 43 of the ferromagnetic pivot plate 40, thereby causing the pivot plate to pivot into its second pivotal position opening the contacts 16 and 17 and closing the contacts 18 and 19. The pivot plate 40 is retained in its second pivotal position by virtue of its having closed a second magnetic circuit comprised of the piston 8, the yoke 44, the pivot plate 40 and the pole piece 11. Since the contacts 18 and 19 are closed, coils 25 and 26 at the second end 6, are shunted. The opening of contacts 16 and 17 has permitted the coils 21 and 22 to be re-energized. The resultant magnetic field produced by the coils 21, 22, 23 and 24 attracts the piston 8 back toward the first end 4 of the guide 2. Thus a reciprocating motion is induced in the piston 8 through the highly efficient means of producing alternate magnetic circuits by the simple operation of pivoting the ferromagnetic pivot plate 40.

It is seen that diode 12 could in fact be an adjustable impedance source which could adjust the speed of reciprocation of the motor. Although the scope of the instant invention should not be restricted to the six coils 21–26 shown in FIG. 3, experimental tests shown that six coils produce an optimum level of performance for the reciprocating motor. It is seen that the reciprocating motor disclosed could be coupled with a feedback circuit to automatically control the reciprocating speed. The motor can be completely sealed for fluid handling applications, thereby greatly reducing the weight and frictional losses involved in moving fluids.

Figure 4:
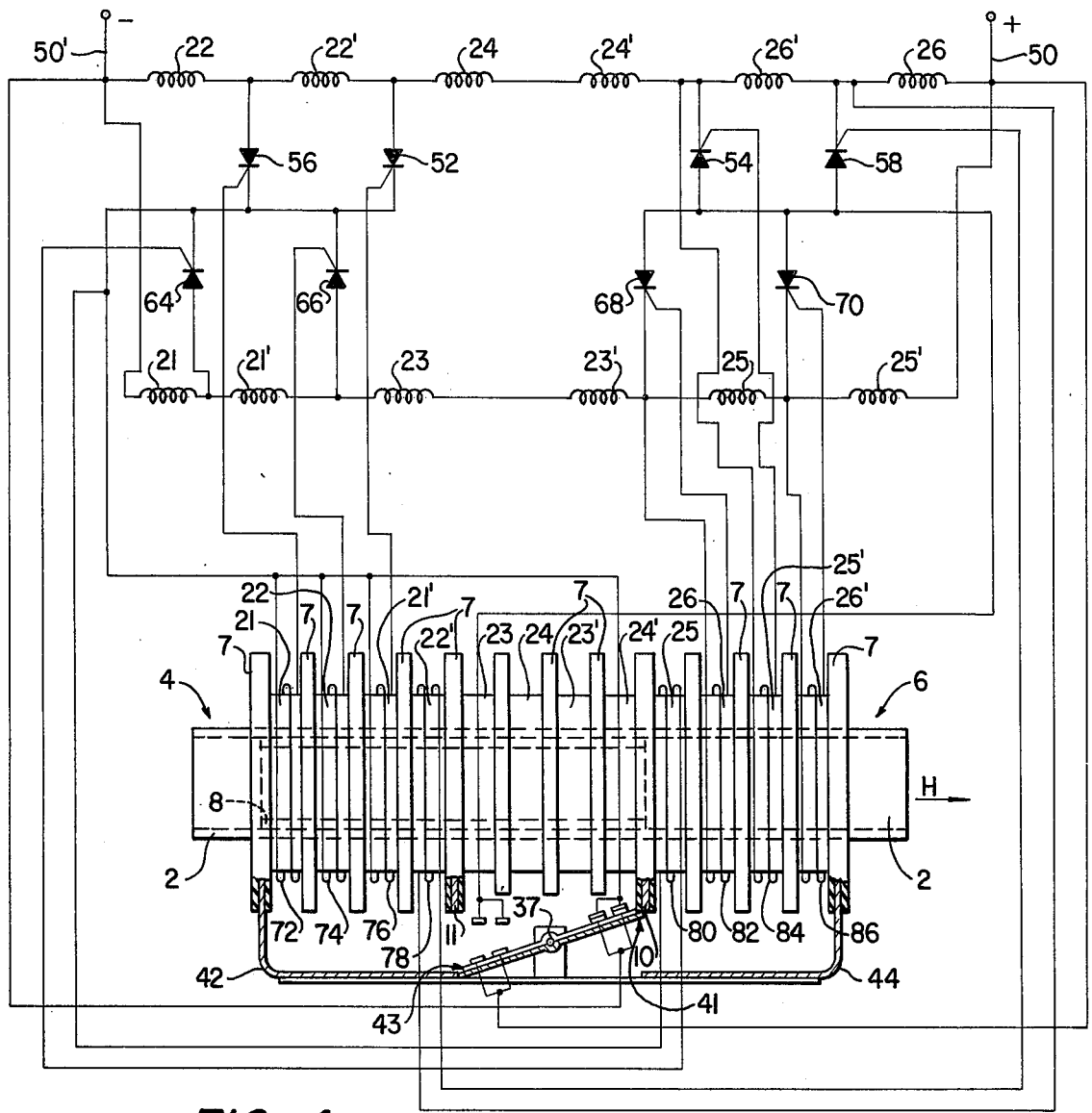
FIG. 4 is a combined circuit and structural illustration of an alternate embodiment of the reciprocating motor invention, using a magnetically triggered thyristor switching circuit.

An alternate embodiment of the direct electromagnetic reciprocating motor invention shown in FIG. 4, employs a thyrsitor circuit to sequentially switch the drive coils, thereby increasing the power output of the motor. In FIG. 4, the guide 2 has a sequence of 12 drive coils 21–26' wound thereupon in the same direction such that when connected to the DC terminals 50 and 50', will produce a magnetic field directed toward the end 6, as is shown by the Vector H. Separating each of the coils 21–26' is an insulating separater 7. Coils 22, 22', 24, 24', 26 and 26' are connected in series betwen the negative terminal 50' and the positive terminal 50. The drive coils 21, 21', 23, 23', 25 and 25' are connected in series between the negative supply terminal 50' and the positive supply terminal 50. Thyristors 52 and 56 have their anodes connected to the nodes between coils 22' and 24 and between coils 22 and 22', respectively. Thyristors 64 and 66 have their anodes connected to the nodes between coils 21 and 21' and between 21' and 23, respectively. The cathodes of thyristors 52, 56, 64 and 66 are connected to the stationary terminals 28 and 30 of the switch mounted on the first end 41 of the pivot plate 40. When the pivot plate 40 is in its first pivotal position, contacts 28 and 30 are in conductive contact with the moveable contacts 29 and 31, connecting the cathodes of thyristors 52, 56, 64 and 66 to the negative supply terminal 50'.

Thyristors 54 and 58 have their cathodes respectively connected to the nodes between the coils 24' and 26 and between 26 and 26'. Thyristors 68 and 70 have their cathodes respectively connected to the nodes between the coils 23' and 25 and between 25' and 25, respectively. The anodes of the thyristors 54, 58, 68, 70 are connected to the stationary terminals 32 and 34 of the switch on the second end 43 of the pivot plate 40. When the pivot plate 40 is in its second pivotal position, the moveable contacts 33 and 35 are in electrical contact with the contacts 32 and 34, thereby connecting the anodes of thyristors 54, 58, 68 and 70 to the positive supply terminal 50.

The preferred embodiment for the thyristors described herein is the silicon controlled rectifier, or SCR. SCR's have the following properties. When the anode is connected to the relatively positive potential and the cathode is connected to a relatively negative potential, a positive gate trigger current must be applied to the gate electrode of the SCR to initiate conduction from anode to cathode. Thereafter, no further signal need be applied to the gate to sustain conduction from anode to cathode. When the external current flow to the anode and cathode is interrupted, the conduction state for the SCR terminates and cannot be renewed without another gate trigger signal.

A first sensing coil 80 is wound about drive coil 25 and is connected between the cathode and gate electrode of the thyristor 64. The sensing coil 80 is wound so that when the magnetic field directed toward the end 6 decreases as the piston 8 moves toward the opposite end 4, a positive pulse is imposed upon the gate electrode of the thyristor 64. Since a negative cathode potential is supplied to the cathode of thyristor 64 by virtue of the closing of the contacts 28, 29, 30 and 31, this positive pulse triggers the thyristor 64 into its conduction state, thereby shunting current around the drive coil 21 so that the net magnetic field produced by the coil 21 disappears. With the piston 8 having come to its left most position at the end 4 as is shown in FIG. 4, and the pivot plate having assumed its first pivotal position as shown in FIG. 4, the contacts 32, 34, 33, and 35 are open, therefor there is no current being conducted by the thyristors 54, 58, 68 or 70 and therefor drive current is flowing through the drive coils 25, 25', 26, and 26' producing a net magnetic field in the end 6. Since a non-magnetized ferromagnetic object such as the piston 8, is attracted toward stronger regions of magnetic flux density, the piston 8 will start its forward motion in the rightward direction toward the end 6, moving from the region of low magnetic flux density within the coil 21.

Sensing coil 72 is wound about the drive coil 21 and is connected between the cathode and gate electrodes of the thyristor 56. As the piston 8 moves in the rightward direction, the magnetic flux density which couples the sensing coil 74, decreases, thereby inducing a positive triggering pulse at gate electrode of the thyristor 56, turning on thyristor 56, thereby shunting the coil 22 and collapsing its magnetic field. While the left end of the piston 8 was still within the coil 21, the magnetic flux contributed by the coil 22 assisted in driving the piston 8 from the weaker region of magnetic flux within the coil 21. However, as the left end of the piston 8 moved into the region of the coil 22, the presence of the magnetic flux produced by the drive coil 22 no longer contributed to the net force on the piston 8, in the rightward direction. Thus, the trigger pulse produced by the sensing coil 72 wound about the drive coil 21, which triggered on the thyristor 56, thereby collapsing the magnetic field produced by the coil 22, permits the maximum utilization of the drive coil 22 in driving the piston in the rightward direction.

Sensing coils 74 and 76 are wound about the drive coils 22 and 21', respectively, and are connected between the cathode and gate electrodes of thyristors 66 and 52, respectively. Sensing coils 74 and 76 operated similarly to the operation discussed for sensing coil 72, sequentially switching their respective thyristors so as to make maximum utilization of the magnetic flux produced by the drive coils 22 and 21' so as to force the piston 8 in the rightward direction.

Sensing coil 78 is wound about the drive coil 22' and is connected between a gate electrode and cathode of the thyristor 58. As the right end of the piston 8 approaches the right end 6 of the tube 2, the magnetic flux which has been coupling the sensing coil 78, collapses as the left end of the piston 8 moves to its right most position coincident with the pole piece 11. At this moment, three substantially simultaneous events occur. The pivot plate 40 pivots into its second pivotal position with the end 43 contacting the pole piece 11. This brings into electrical contact the terminals 32, 33, 34 and 35, connecting the positive supply potential at terminal 50 to the anodes of the thyristors 54, 58, 68 and 70. The second event which takes place is a current pulse which is induced in the sensing coil 78 by the collapse of the magnetic field as the piston 8 moves past the sensing coil 78. This positive current pulse is applied to the gate terminal of the thyristor 58 which, having the anode potential applied thereto, enters into its conduction state, thereby shunting drive current around the drive coil 26' thereby causing the collapse of the magnetic field produced by the coil 26' at the right end 6 of guide tube 2. A third event occurring at substantially this time is the opening of the contacts 28 and 29 and 30 and 31, thereby cutting off the cathode potential to the cathodes of the thyristors 52, 56, 64 and 66. This allows drive current to flow through the drive coils 21, 21', 22 and 22', causing a large magnetic flux to exist within these coils. Thus the mirror image of the situation which obtained when the piston was at end 4, now exists for the piston at its right most end 6. There is a low magnetic flux density within the coil 26' and a high magnetic flux density at the opposite end 4 of the tube. The ferromagnetic piston 8 is therefor attracted in the leftward direction.

Sensing coils 86, 84 and 82 are wound about the drive coils 26', 25' and 26, respectively and are connected between the cathode and gate electrode of the thyristors 70, 54 and 68, respectively. As the right end of the piston 8 moves past each of the sensing coils 86, 84 and 82, the magnetic flux which had previously existed within the respective sensing coils, collapses, thereby inducing a positive trigger pulse which turns on the respective thyristor 70, 54 and 68, respectively. Thus the sequential turning off of the magnetic fields produced by the drive coils 26', 25' and 26, makes optimum use of their capacity to propel the piston 8 in the leftward direction. The sequential switching of the drive coils increases the maximum output power capacity of the motor.

There results, a highly efficient direct electromagnetic reciprocating motor having a minimum number of parts, a high reliability, and capable of use in applications requiring a miniaturized prime mover.

The selection of four coils on the left end 4 and four drive coils on the right end 6, presents an optimum grouping of drive coils for many applications. However, other applications may exist where fewer or a greater number of drive coils can be employed. It is within the scope of the invention to have a single drive coil on the left end 4 and a single drive coil on the right end 6, having thyristor shunt circuits triggered by single sensing coils mounted on opposed ends to the respective drive coils. Other circuit configurations are also within the scope of this invention, besides the series-parallel configurations shown in FIG. 4. A simple series connection of drive coils or a simple parallel connection of drive coils may be selected, depending upon the driving power and reciprocating frequency required for the application involved.

While I have described and illustrated several specific embodiments of my invention, it will be clear that variations from the details of construction which are specifically illustrated and described may be resorted to without departing from the true spirit and scope of the invention as defined in the appended claims.

I claim:

1. A reciprocating motor, comprising:
 a hollow, tubular guide having a first coil mounted about a first end thereof, a third coil mounted about a central portion thereof, and a second coil mounted about a second end thereof;
 a ferromagnetic piston mounted in sliding engagement within said hollow guide, having a length which overlaps said first and third coils when located at said first end and which overlaps said second and third coils when located at said second end;
 a first ferromagnetic pole piece mounted on the central portion of said guide and spaced at said piston length from said first end thereof;
 a second ferromagnetic pole piece mounted on the central portion of said guide and spaced at said piston length from said second end thereof;
 a ferromagnetic pivot plate, pivotally mounted on the central portion of said guide, having a first end which contacts said first pole piece at a first pivotal position and a second end which contacts said second pole piece at a second pivotal position;
 a first ferromagnetic yoke having a first end mounted on said first end of said guide and a second end spaced from said central portion of said guide and contacting said second end of said pivot plate at said first pivotal position;
 a second ferromagnetic yoke having a first end mounted on said second end of said guide and a second end spaced from said central portion of said guide and contacting said first end of said pivot plate at said second pivotal position;
 said plate pivoting into said first pivotal position forming a first magnetic circuit with said piston, first pole piece, and first yoke when said piston is at said first end of said guide;
 said plate pivoting into said second pivotal position forming a second magnetic circuit with said piston, second pole piece, and second yoke when said piston is at said second end of said guide;
 an electrical switching means mounted on said pivot plate and electrically connected to said first and second coils, for energizing said first coil when said plate is at said second pivotal position and for energizing said second coil when said plate is at said first pivotal position;
 whereby said piston is forced into reciprocating motion within said guide.

2. The apparatus of claim 1, wherein said switching means further comprises:
 a first contact means mounted on said first end of said pivot plate and electrically connected to said first coil to shunt said first coil when said plate is in said first position;
 a second contact means mounted on said second end of said pivot plate and electrically connected to said second coil to shunt said second coil when said plate is in said second position.

3. The apparatus of claim 2, which further comprises:
 said first coil comprises a fourth and fifth coils wound with first ends in a first direction;
 said third coil comprises a sixth and seventh coils wound with first ends in a first direction;
 said second coil comprises an eighth and ninth coils wound with first ends in a first direction;
 said fourth and fifth coils having said first ends connected to a first input terminal;
 said fourth coil having a second end connected to said first end of said sixth coil and, through said first contact, to said first input terminal;
 said fifth coil having said second end connected to said first end of said seventh coil and, through said first contact, to said first input terminal
 said sixth coil having said second end connected to said first end of said eighth coil and, through said second contact, to a second input terminal;
 said seventh coil having said second end connected to said first end of said ninth coil and, through said second contact, to said second terminal;
 said eighth and ninth coils having said second ends connected to said second input terminal.

4. The apparatus of claim 3, which further comprises:
 a current rectification means in series between said second input terminal and an alternating current source.

5. The apparatus of claim 3, which further comprises:
 a current adjusting means in series between said second input terminal and a current supply source, to adjust the speed of the reciprocating motor.

6. The apparatus of claim 1, wherein said guide is a hollow cylinder which constrains said piston to undergo linear reciprocating motion.

7. The apparatus of claim 2, which further comprises:
 said first and second coils being connected between positive and negative direct current supply terminals;
 a first thyristor having its anode connected at a first end of said first coil opposite from said negative supply terminal and its cathode connected to said first contact means on said pivot plate;
 a first sensing coil wound about said second coil and connected between said cathode and the gate electrode of said first thyristor, for generating a trigger pulse when said piston moves toward said first end of said guide;

said first contact means being connected to said negative supply terminal when said pivot plate is in said first pivotal position, supplying a cathode potential to said first thyristor;

a second thyristor having its cathode connected at a first end of said second coil opposite from said positive supply terminal and its anode connected to said second contact means on said pivot plate;

a second sensing coil wound about said first coil and connected between said cathode and the gate electrode of said second thyristor, for generating a trigger pulse when said piston moves toward said second end of said guide;

said second contact means being connected to said positive supply terminal when said pivot plate is in said second pivotal position, supplying an anode potential to said second thyristor;

whereby said piston undergoes reciprocating motion in said guide.

8. The apparatus of claim 2, which further comprises:

said first coil comprised of a fourth and fifth coils connected between positive and negative direct current supply terminals, with the fourth coil proximate to and said fifth coil spaced from said first end of said guide;

a first thyristor having its anode connected at a first end of said fourth coil opposite from said negative supply terminal and its cathode connected to said first contact means on said pivot plate;

a second thyristor having its anode connected at a first end of said fifth coil opposite from said negative supply terminal and its cathode connected to said first contact means on said pivot plate;

a first sensing coil wound about said second coil proximate to said first pole piece, and connected to said cathode and the gate electrode of said first thyristor, for generating a trigger pulse when said piston moves toward said first end of said guide;

a second sensing coil wound about said first coil proximate to said first end of said guide, and connected to said cathode and the gate electrode of said second thyristor, for generating a trigger pulse when said piston starts to move toward said second end of said guide;

said first contact means being connected to said negative supply terminal when said pivot plate is in said first pivotal position, supplying a cathode potential to said first and second thyristors;

said second coil comprised of a sixth and seventh coils connected between said positive and negative direct current supply terminals, with the sixth coils proximate to and the seventh coil spaced from said second end of said guide;

a third thyristor having its cathode connected at a first end of said sixth coil opposite from said positive supply terminal and its anode connected to said second contact means on said pivot plate;

a fourth thyristor having its cathode connected at a first end of said seventh coil opposite from said positive supply terminal and its anode connected to said second contact means on said pivot plate;

a third sensing coil wound aout said first coil proximate to said second pole piece, and connected between said cathode and the gate electrode of said third thyristor, for generating a trigger pulse when said piston moves toward said second end of said guide;

a fourth sensing coil wound about said second coil proximate to said second end of said guide, and connected between said cathode and the gate electrode of said fourth thyristor, for generating a trigger pulse when said piston starts to move toward said first end of said guide;

said second contact means being connected to said positive supply terminal when said pivot plate is in said second pivotal position, supplying an anode potential to said third and fourth thyristors;

whereby said piston undergoes reciprocating motion in said guide.

9. The apparatus of claim 2, which further comprises:

said first coil comprised of a fourth, fifth, sixth and seventh coils connected between positive and negative direct current supply terminals, mounted between said first end of said guide and said second pole piece, with the fourth coil proximate to said first end of said guide, the seventh coil proximate to said second pole piece, the fifth coil proximate to said fourth coil and the sixth coil proximate to the seventh coil;

a first, second, third and fourth thyristors having their anodes respectively connected at first ends of said fourth, fifth, sixth and seventh coils, opposite from said negative supply terminal and their cathodes connected to said first contact means on said pivot plate;

said first contact means being connected to said negative supply terminal when said pivot plate is in said first pivotal position, supplying a cathode potential to said first, second, third and fourth thyristors;

said second coil comprised of a eighth, ninth, 10th and 11th coils connected between said positive and negative direct current supply terminals, mounted between said second end of said guide and said first pole piece, with the eighth coil proximate to said second end of said guide, the eleventh coil proximate to said first pole piece, said ninth coil proximate to said eighth coil and said tenth coil proximate to said 11th coil;

a fifth, sixth, seventh and eighth thyristors having their cathodes respectively connected at first ends of said eighth, ninth, 10th and 11th coils, opposite from said positive supply terminal and their anodes connected to said second contact means on said pivot plate;

said second contact means being connected to said positive supply terminal when said pivot plate is in said second pivotal position, supplying an anode potential to said fifth, sixth, seventh and eighth thyristors;

a first sensing coil wound around said eleventh coil and connected between the cathode and gate electrode of said first thyristor;

a second, third and fourth sensing coils, respectively wound around said fourth, fifth and sixth coils, and respectively connected between the cathode and gate electrode of said second, third and fourth thyristors;

a fifth sensing coil wound around said seventh coil and connected between the cathode and gate electrode of said fifth thyristor;

a sixth, seventh and eighth sensing coils respectively wound around said eighth, ninth and 10th coils, and respectively connected between the cathode and gate electrode of said sixth, seventh and eighth thyristors;

whereby said piston undergoes reciprocating motion in said guide.

10. The apparatus of claim 9, which further comprises:

said third coil comprised of a 12th and 13th coils;

said fifth, seventh, 12th, 10th and eighth coils are connected in series between said positive and negative supply terminals;

said fourth, sixth, 13th, 11th and ninth coils are connected in series between said positive and negative supply terminals.

* * * * *